(12) United States Patent
Lee (10) Patent No.: US 11,407,329 B2
(45) Date of Patent: Aug. 9, 2022

(54) APPARATUS AND METHOD FOR CONTROLLING VEHICLES MOTOR BASED ON TEMPERATURE OF BATTERY

(71) Applicant: DOOSAN CORPORATION, Seoul (KR)

(72) Inventor: Jin Yong Lee, Incheon (KR)

(73) Assignee: DOOSAN CORPORATION, Incheon (KR)

( * ) Notice: Subject to any disclaimer, the term of this patent is extended or adjusted under 35 U.S.C. 154(b) by 413 days.

(21) Appl. No.: 16/545,018

(22) Filed: Aug. 20, 2019

(65) Prior Publication Data

US 2020/0062141 A1 Feb. 27, 2020

(30) Foreign Application Priority Data

Aug. 21, 2018 (KR) .................. 10-2018-0097133

(51) Int. Cl.
| | |
|---|---|
| *H02J 7/00* | (2006.01) |
| *B60L 58/24* | (2019.01) |
| *B60L 15/00* | (2006.01) |
| *B60W 20/13* | (2016.01) |
| *B60W 10/26* | (2006.01) |
| *B60L 50/50* | (2019.01) |
| *B60L 58/26* | (2019.01) |

(52) U.S. Cl.
CPC .............. *B60L 58/24* (2019.02); *B60L 15/007* (2013.01); *B60L 50/50* (2019.02); *B60L 58/26* (2019.02); *B60W 10/26* (2013.01); *B60W 20/13* (2016.01); *B60L 2200/40* (2013.01); *B60L 2240/545* (2013.01)

(58) Field of Classification Search
CPC ........ B60L 58/24; B60L 15/007; B60L 50/50; B60L 58/26; B60L 2200/40; B60L 2240/545; B60W 10/26; B60W 20/13
USPC ........................................... 320/109; 701/22
See application file for complete search history.

(56) References Cited

U.S. PATENT DOCUMENTS

| | | | |
|---|---|---|---|
| 6,624,615 | B1 | 9/2003 | Park |
| 9,308,828 | B2 | 4/2016 | Wu |
| 2013/0249277 | A1 | 9/2013 | Park |
| 2017/0284062 | A1 | 10/2017 | Osaka |

(Continued)

FOREIGN PATENT DOCUMENTS

EP 2130734 A1 12/2009

OTHER PUBLICATIONS

Search Report issued in corresponding European Patent Application No. 19192818.3 dated Jan. 9, 2020, consisting of 8 pp.

*Primary Examiner* — Zixuan Zhou
(74) *Attorney, Agent, or Firm* — Volpe Koenig (57) ABSTRACT

An apparatus for controlling vehicle motors based on a battery temperature includes: a battery temperature sensor unit for measuring a temperature of a battery pack of an industrial vehicle; a battery monitoring unit for monitoring a measured value of the temperature sensor unit, and for transmitting temperature information when the temperature of the battery pack is out of a reference value that is predetermined; a vehicle control unit for restricting driving of a motor that receives a power from the battery pack based on the temperature information; and a fan control unit for controlling driving of a fan that cools the battery pack based on the temperature information.

10 Claims, 4 Drawing Sheets

(56) References Cited

U.S. PATENT DOCUMENTS

2018/0312076 A1* 11/2018 Lee .................. H01M 10/6563
2018/0334160 A1* 11/2018 Kava .................... B60W 10/08

* cited by examiner

APPARATUS AND METHOD FOR CONTROLLING VEHICLES MOTOR BASED ON TEMPERATURE OF BATTERY

CROSS-REFERENCE TO RELATED APPLICATION

This application claims priority under 35 U.S.C. § 119 to Korean Patent Application No. 10-2018-0097133, filed on Aug. 21, 2018, in the Korean Intellectual Property Office (KIPO), the disclosure of which is incorporated by reference herein in its entirety.

1. TECHNICAL FIELD

Embodiments of the present invention relate to an apparatus and a method for controlling motors of vehicles based on temperature of a battery used for industrial vehicles.

2. DISCUSSION OF RELATED ART

Batteries are used as a drive source for driving drive motors and hydraulic pump motors of industrial vehicles, and the batteries are very sensitive to temperature.

That is, batteries generate heat when they are charged or discharged. If the generated heat rises above a predetermined temperature, the life of the battery pack may be shortened, and a dangerous situation such as explosion or ignition may occur.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY

Embodiments of the present invention may be directed to an apparatus and a method for controlling motors of vehicles so that a temperature of a battery does not rise higher than a predetermined temperature, thereby substantially preventing reduction in battery life.

In addition, embodiments of the present invention may be also directed to substantially preventing a temperature rise of a battery cell and to minimizing or significantly reducing degradation in performance and operation efficiency of industrial vehicles.

According to an embodiment, an apparatus for controlling vehicle motors based on a battery temperature includes: a battery temperature sensor unit for measuring a temperature of a battery pack of an industrial vehicle; a battery monitoring unit for monitoring a measured value of the battery temperature sensor unit, and for transmitting temperature information when the temperature of the battery pack is out of a reference value that is predetermined; a vehicle control unit for restricting driving of a motor that receives a power from the battery pack based on the temperature information; and a fan control unit for controlling driving of a fan that cools the battery pack based on the temperature information.

The apparatus may further include an output unit for notifying a user of one or more of the temperature information and restriction of driving of the motor, based on the temperature information.

The vehicle control unit may limit a revolutions per minute (RPM) of at least one of a drive motor and a pump motor when the temperature of the battery pack is higher than a drive restriction temperature that is predetermined. The fan control unit may drive the fan of the battery pack when the temperature of the battery pack is higher than a caution temperature that is predetermined. The drive restriction temperature may be substantially equal to or higher than the caution temperature.

The vehicle control unit may release restriction of driving of at least one of the drive motor and the pump motor when the temperature of the battery pack is lower than a derestriction reference temperature that is predetermined. The fan control unit may stop driving of the fan of the battery pack when the temperature of the battery pack is lower than a safety reference temperature that is predetermined. The derestriction reference temperature may be substantially equal to or higher than the safety reference temperature.

The caution temperature may be substantially equal to or higher than the safety reference temperature. The drive restriction temperature may be substantially equal to or higher than the derestriction reference temperature.

The battery temperature sensor unit may include: a plurality of temperature sensors for sensing temperatures of different battery cells of the battery pack that includes a plurality of battery cells, and based on the temperature information, the battery monitoring unit may transmit the temperature information to the fan control unit to turn on the fan of the battery pack when a measured value of at least one of the plurality of temperature sensors is out of a first reference temperature that is predetermined, and transmit the temperature information to the vehicle control unit to restrict driving of at least one of the drive motor and the pump motor when an average value of the plurality of temperature sensors is out of the first reference temperature that is predetermined.

Based on the temperature information, the fan control unit may transmit the temperature information to the vehicle control unit to release restriction of driving of at least one of the drive motor and the pump motor when the measured value of at least one of the plurality of temperature sensors is substantially equal to or lower than a second reference temperature that is predetermined, and the vehicle control unit may transmit the temperature information to the fan control unit to turn off the fan of the battery pack when an average value of the plurality of temperature sensors is substantially equal to or lower than the second reference temperature that is predetermined.

According to another embodiment, a method for controlling vehicle motors based on a battery temperature includes: a battery temperature sensor measuring a temperature of a battery pack of an industrial vehicle; a battery monitoring unit monitoring the measured temperature, and transmitting temperature information when the measured temperature is out of a reference value that is predetermined; a fan control unit driving a fan based on the temperature information so as to cool the battery pack; and a vehicle control unit restricting driving of at least one of a drive motor and a pump motor based on the temperature information.

The restricting of driving of at least one of the drive motor and the pump motor by the vehicle control unit may include: the vehicle control unit limiting a revolutions per minute (RPM) of at least one of the drive motor and the pump motor when the temperature of the battery pack is higher than a drive restriction temperature that is predetermined.

The method may further include: the vehicle control unit releasing the restriction of driving of at least one of the drive motor and the pump motor when the temperature of the battery pack is lower than a derestriction reference temperature that is predetermined, and the fan control unit stopping driving of the fan of the battery pack when the temperature of the battery pack is lower than a safety reference temperature that is predetermined.

In the measuring of the temperature of the battery pack of the industrial vehicle by the battery temperature sensor, the battery temperature sensor may sense temperatures of different battery cells of the battery pack that includes a plurality of battery cells. In the driving of the fan, the fan of the battery pack may be turned on when a measured value of at least one of the plurality of temperature sensors is out of a first reference temperature that is predetermined. In the restricting of driving of at least one of the drive motor and the pump motor, driving of at least one of the drive motor and the pump motor may be restricted when an average value of the plurality of temperature sensors is out of the first reference temperature that is predetermined.

The method may further include: based on the temperature information, the fan control unit transmitting the temperature information to the vehicle control unit to release the restriction of driving of at least one of the drive motor and the pump motor when the measured value of at least one of the plurality of temperature sensors is substantially equal to or lower than a second reference temperature that is predetermined, and the vehicle control unit transmitting the temperature information to the fan control unit to turn off the fan of the battery pack when the average value of the plurality of temperature sensors is out of the second reference temperature that is predetermined.

The foregoing is illustrative only and is not intended to be in any way limiting. In addition to the illustrative aspects, embodiments and features described above, further aspects, embodiments and features will become apparent by reference to the drawings and the following detailed description.

BRIEF DESCRIPTION OF THE DRAWINGS

A more complete appreciation of the present invention will become more apparent by describing in detail embodiments thereof with reference to the accompanying drawings, wherein.

DETAILED DESCRIPTION

Embodiments will now be described more fully hereinafter with reference to the accompanying drawings. Although the invention may be modified in various manners and have several embodiments, embodiments are illustrated in the accompanying drawings and will be mainly described in the specification. However, the scope of the present invention is not limited to the embodiments and should be construed as including all the changes, equivalents and substitutions included in the spirit and scope of the present invention.

In the drawings, thicknesses of a plurality of layers and areas are illustrated in an enlarged manner for clarity and ease of description thereof. When a layer, area, or plate is referred to as being "on" another layer, area, or plate, it may be directly on the other layer, area, or plate, or intervening layers, areas, or plates may be present therebetween. Conversely, when a layer, area, or plate is referred to as being "directly on" another layer, area, or plate, intervening layers, areas, or plates may be absent therebetween. Further when a layer, area, or plate is referred to as being "below" another layer, area, or plate, it may be directly below the other layer, area, or plate, or intervening layers, areas, or plates may be present therebetween. Conversely, when a layer, area, or plate is referred to as being "directly below" another layer, area, or plate, intervening layers, areas, or plates may be absent therebetween.

The spatially relative terms "below", "beneath", "lower", "above", "upper" and the like, may be used herein for ease of description to describe the relations between one element or component and another element or component as illustrated in the drawings. It will be understood that the spatially relative terms are intended to encompass different orientations of the device in use or operation, in addition to the orientation illustrated in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in the other direction and thus the spatially relative terms may be interpreted differently depending on the orientations.

Throughout the specification, when an element is referred to as being "connected" to another element, the element is "directly connected" to the other element, or "electrically connected" to the other element with one or more intervening elements therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined at the present specification.

Some of the parts which are not associated with the description may not be provided in order to specifically describe embodiments of the present invention and like reference numerals refer to like elements throughout the specification.

Figure 1:
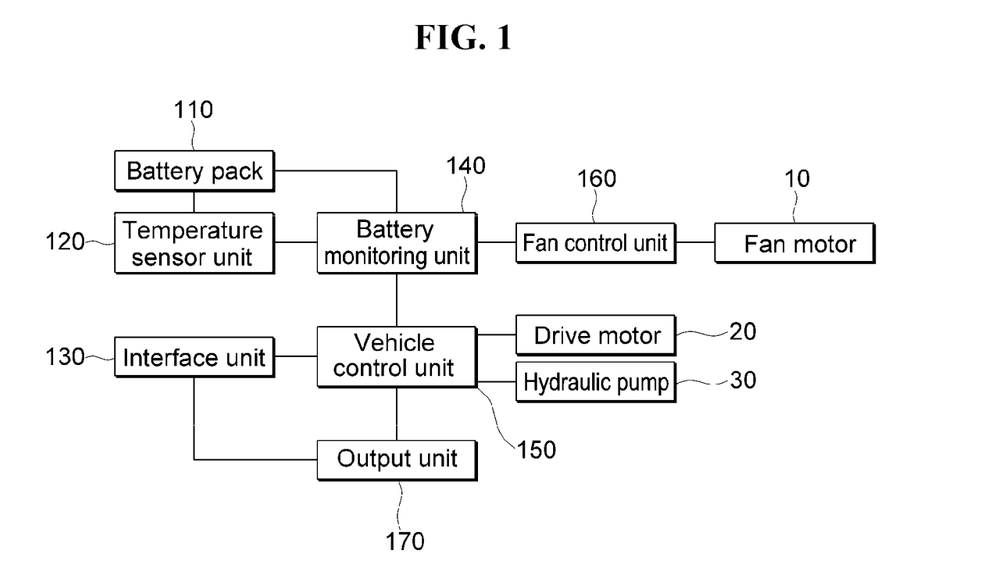
FIG. 1 is a block diagram schematically illustrating an internal configuration of an apparatus for controlling a motor of an industrial vehicle according to an embodiment.
Figure 2:
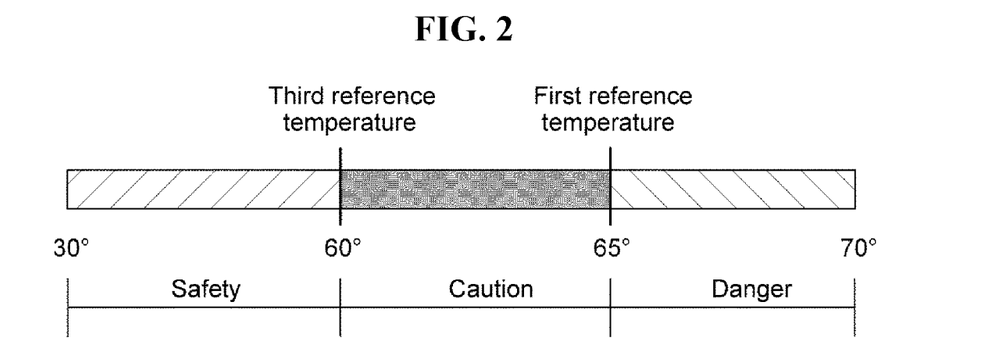
FIG. 2 is an exemplary view for explaining setting of a reference range based on temperature of a battery pack of an industrial vehicle according to an embodiment.

FIG. 1 is a block diagram schematically illustrating an internal configuration of an apparatus for controlling a motor of an industrial vehicle according to an embodiment, and FIG. 2 is an exemplary view for explaining setting of a reference range based on temperature of a battery pack of an industrial vehicle according to an embodiment.

As illustrated in FIG. 1, an apparatus for controlling a vehicle motor based on temperature of a battery of an industrial vehicle according to an embodiment includes a battery pack 110, a battery temperature sensor unit 120, an interface unit 130, a battery monitoring unit 140, a vehicle control unit 150, a fan control unit 160, and an output unit 170.

The battery pack 110 applies a driving voltage to various motors of the industrial vehicle. The battery pack 110 includes at least one battery cell. A battery cell refers to a minimum unit that is rechargeable through an electrochemical reaction.

The battery temperature sensor unit 120 is connected to the battery pack to measure a temperature of the battery cell. A thermistor whose resistance varies according to temperature may be used as a temperature sensor of the battery temperature sensor unit 120.

The battery temperature sensor unit 120 transmits a measured value to the battery monitoring unit 140.

The interface unit 130 includes an input means for inputting a predetermined signal by operation of an operator or a setter.

The battery monitoring unit 140 includes a microprocessor and/or an electric circuit for sensing the battery state to apply a power of the battery pack 110 to each unit, and controlling the battery to be properly driven.

The battery monitoring unit 140 reads a signal indicating the temperature of the corresponding battery cell from the battery temperature sensor unit 120, and monitors whether the temperature of the battery cell is out of a predetermined safety range.

The battery monitoring unit 140 transmits temperature information of the battery pack to the fan control unit 160 or the vehicle control unit 150 when the temperature of the battery cell is out of the predetermined safety range.

The vehicle control unit 150 controls driving of at least one of the drive motor and the hydraulic pump motor, and controls the performance of at least one of the drive motor and the hydraulic pump motor.

The vehicle control unit 150 restricts or derestricts (i.e., releases restriction of) driving of the motor that receives a voltage from the battery pack 110, based on the temperature information provided from the battery monitoring unit 140. The motor may include at least one of the drive motor and the hydraulic pump motor.

The vehicle control unit 150 controls a revolutions per minute (RPM) of the motor by controlling an output current so as to control the performance of at least one of the drive motor and the hydraulic pump motor. More specifically, when a temperature of the battery pack 110 is higher than a first reference temperature that is predetermined, the vehicle control unit 150 restricts driving of at least one of the drive motor and the hydraulic pump motor, and when the measured temperature is lower than a second reference temperature that is predetermined, the vehicle control unit 150 derestricts driving of at least one of the drive motor and the hydraulic pump motor. The second reference temperature is substantially equal to or lower than the first reference temperature. The second reference temperature may be lower than the first reference temperature and higher than a third reference temperature. In a case where the second reference temperature is lower than the first reference temperature, safety may be improved in the system since the state of restriction and derestriction of the performance does not change continuously.

The fan control unit 160 is connected to a motor of a fan of the battery pack 110 so as to control driving of the motor of the fan.

The battery pack 110 is provided in a tray at which a cooling fan for discharging heat generated from the battery pack 110 to the outside is provided. An air inlet and an outlet are provided at arbitrary positions on opposite sides of the tray, respectively, and in a case where the cooling fan is driven, an air drawn in from the air inlet is exhausted through the outlet to lower the temperature of the battery pack 110.

The fan control unit 160 receives the temperature information, and the fan control unit 160 drives the fan when the measured temperature is higher than the third reference temperature that is predetermined, and stops driving of the fan when the measured temperature is lower than a fourth reference temperature that is predetermined. The fourth reference temperature is substantially equal to or lower than the third reference temperature. In a case where the fourth reference temperature is lower than the third reference temperature, safety may be improved in the system since the state of restriction and derestriction of the performance does not change continuously.

The third reference temperature is substantially equal to or lower than the first reference temperature. The fourth reference temperature is substantially equal to or lower than the second reference temperature.

The output unit 170 outputs information provided from the control unit 150. The information may include temperature information, and a notification of the restriction or derestriction of driving of at least one of the drive motor and the hydraulic pump motor. The information may include a notification of driving and non-driving of the fan.

As illustrated in FIG. 2, a temperature substantially equal to or higher than the first reference temperature falls within a danger range for the temperature of the battery pack, and a temperature between the first reference temperature and the third reference temperature falls within a caution range.

It is depicted as an example in FIG. 2 that a safety range is from about 30° to about 60°, a caution range is from about 60° to about 65°, and a danger range is from about 65° to about 70°, but embodiments are not limited thereto. The temperature range may be changed by an operator or a setter.

That is, in a case where the temperature of the battery pack reaches the third reference temperature at which the temperature of the battery pack enters the caution range from the safety range, the battery monitoring unit 140 transmits the temperature information to the fan control unit 160 so as to drive the fan, thereby lowering the temperature of the battery pack. In addition, in a case where the temperature of the battery pack reaches the first reference temperature at which the temperature of the battery pack enters the danger range from the caution range, the battery monitoring unit 140 transmits the temperature information to the vehicle control unit 150, and the vehicle control unit 150 restricts driving of the motor so that the temperature of the battery no longer rises.

Figure 3:
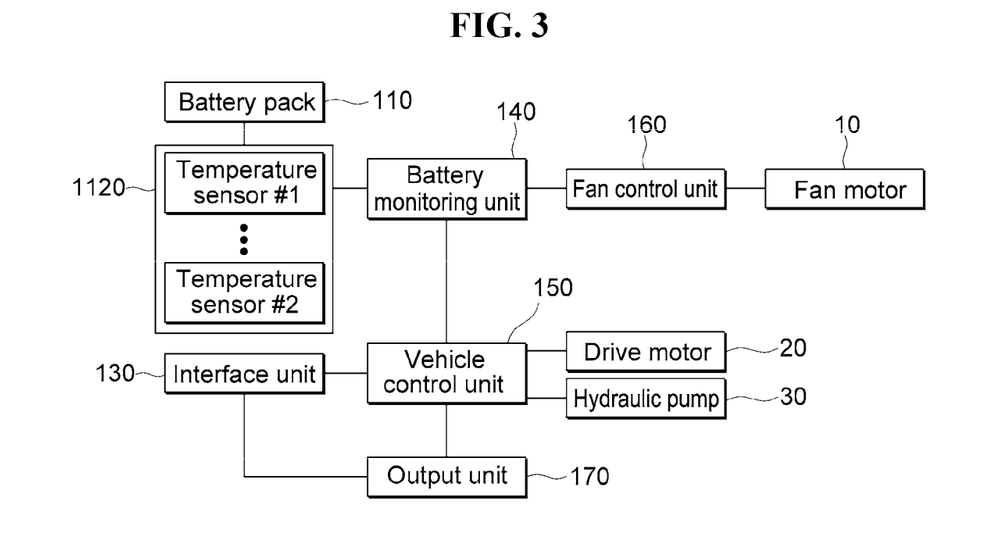
FIG. 3 is a block diagram schematically illustrating an internal configuration of an apparatus for controlling a motor of an industrial vehicle according to another embodiment.

FIG. 3 is a block diagram schematically illustrating an internal configuration of an apparatus for controlling a motor of an industrial vehicle according to another embodiment.

Like reference numerals in FIG. 1 denote like elements, and a detailed description thereof will be omitted.

As illustrated in FIG. 1, an industrial vehicle according to the present embodiment includes a battery pack 110, a battery temperature sensor unit 1120, an interface unit 130, a battery monitoring unit 1140, a vehicle control unit 1150, a fan control unit 1160, and an output unit 170.

The battery pack 110 applies a driving voltage to various motors of the industrial vehicle. The battery pack 110 includes a plurality of battery cells.

The battery temperature sensor unit 1120 is connected to the battery pack 110 to measure a temperature of a battery cell. The battery battery temperature sensor unit 1120 includes a plurality of temperature sensors. The plurality of temperature sensors measure the temperature of the different battery cells of the battery pack which includes the plurality of battery cells.

The battery temperature sensor unit 1120 transmits the measured value to the battery monitoring unit 1140.

The battery monitoring unit 1140 monitors a state of the battery pack 110.

The battery monitoring unit 1140 receives the measured value of the plurality of temperature sensors of the battery temperature sensor unit 1120, and when the received measured value is out of a predetermined reference value, the battery monitoring unit 1140 transmits temperature information to the vehicle control unit 1150 and the fan control unit 1160.

In addition, based on the temperature information received from the battery monitoring unit 1140, when the measured value of at least one of the plurality of temperature sensors is out of a first reference temperature that is predetermined, the fan control unit 1160 transmits the temperature information to the fan control unit 1160 so that a fan of the battery is turned on.

In a case where the measured value of at least one of the plurality of temperature sensors is out of the first reference temperature that is predetermined, the battery monitoring unit 1140 calculates an average value of the plurality of temperature sensors. In a case where the average value of the plurality of temperature sensors is out of the first reference temperature that is predetermined, the temperature information is transmitted to the vehicle control unit 1150 so that the performance of at least one of the drive motor and the hydraulic pump motor is controlled.

When the average value of the plurality of temperature sensors is lower than a third reference temperature that is predetermined, the battery monitoring unit 1140 transmits the temperature information to the vehicle control unit 1150 to release the performance restriction. Further, when the temperatures of all the temperature sensors are lower than the third reference temperature, the battery monitoring unit 1140 transmits the temperature information to turn off the fan of the battery. The third reference temperature is lower than the first reference temperature. The first reference temperature is a reference temperature at which the temperature of the battery cell enters the danger range from the caution range, and the third reference temperature is a reference temperature at which the temperature of the battery cell enters the caution range from the safety range.

The vehicle control unit 1150 controls an RPM of the motor by controlling an output current, so as to control the performance of at least one of the drive motor and the hydraulic pump motor.

The vehicle control unit 1150 restricts or derestricts driving of the motor that receives a voltage from the battery pack 110 based on the temperature information provided from the battery monitoring unit 1140. Such a motor may include at least one of a drive motor and a hydraulic pump motor.

More specifically, when the average temperature of the battery pack 110 is higher than the first reference temperature that is predetermined, the vehicle control unit 1150 restricts driving of at least one of the drive motor and the hydraulic pump motor, and when the measured temperature is lower than the third reference temperature that is predetermined, the vehicle control unit 1150 releases restriction of driving of at least one of the drive motor and the hydraulic pump motor. The third reference temperature is substantially equal to or lower than the first reference temperature.

Based on the temperature information received from the battery monitoring unit 1140, the vehicle control unit 1150 releases the performance restriction of the motor, when the average value of the plurality of temperature sensors is lower than the third reference temperature that is predetermined.

Based on the temperature information received from the battery monitoring unit 1140, the fan control unit 1160 turns off a fan motor 10, when all of the temperatures of the plurality of temperature sensors are lower than the third reference temperature.

Figure 4:
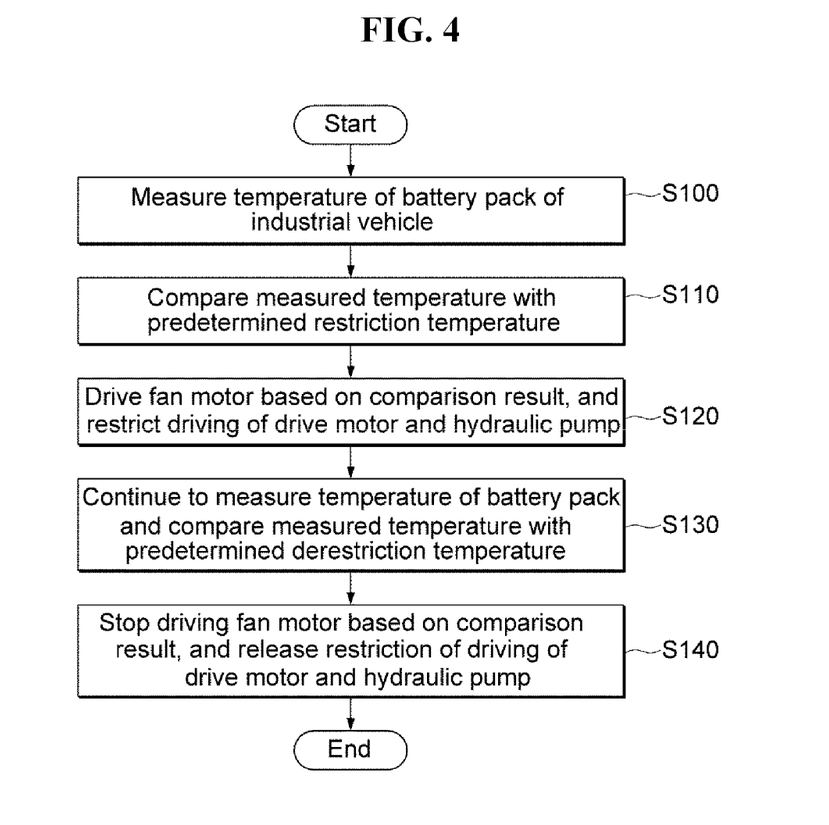
FIG. 4 is a flowchart illustrating a method for controlling a motor of an industrial vehicle according to an embodiment.

FIG. 4 is a flowchart illustrating a method for controlling a motor of an industrial vehicle according to an embodiment.

A temperature of a battery pack of an industrial vehicle is measured by a temperature sensor (S100). When using a temperature sensor unit including a plurality of temperature sensors, the average of the measured values of each of the plurality of temperature sensors can be used.

A battery monitoring unit compares the temperature measured by the temperature sensor with a restriction temperature that is predetermined (S110). The battery monitoring unit transmits temperature information to a fan control unit or a vehicle control unit according to the comparison result. In addition, the battery monitoring unit may transmit the temperature information to an output unit, and the temperature information may be output visually or audibly so that an operator may check it.

Based on the comparison result, a vehicle control unit restricts driving of at least one of a drive motor and a hydraulic pump motor, and a fan control unit drives a fan motor (S120).

An example of a method of restricting at least one of the drive motor and the hydraulic pump motor may include limiting an RPM.

In restricting the RPM, the RPM is reduced by a predetermined percentage at a predetermined interval to ensure the safety of the system. For example, a current RPM (a1) may be reduced by about 10% for about five minutes, and then the RPM that has been reduced by about 10% may be reduced again by about 10% for about five minutes.

The battery monitoring unit continuously monitors the temperature of the battery pack and compares the temperature with a derestriction temperature that is predetermined (S130).

In a case where the temperature of the battery pack becomes lower than the derestriction temperature, that is predetermined, as the comparison result, the battery monitoring unit transmits the temperature information to the fan control unit and the vehicle control unit, and the fan control unit that has received the temperature information stops the fan motor, and the vehicle control unit that has received the temperature information releases the restriction of driving of at least one of the drive motor and the hydraulic pump motor (S140).

Figure 5:
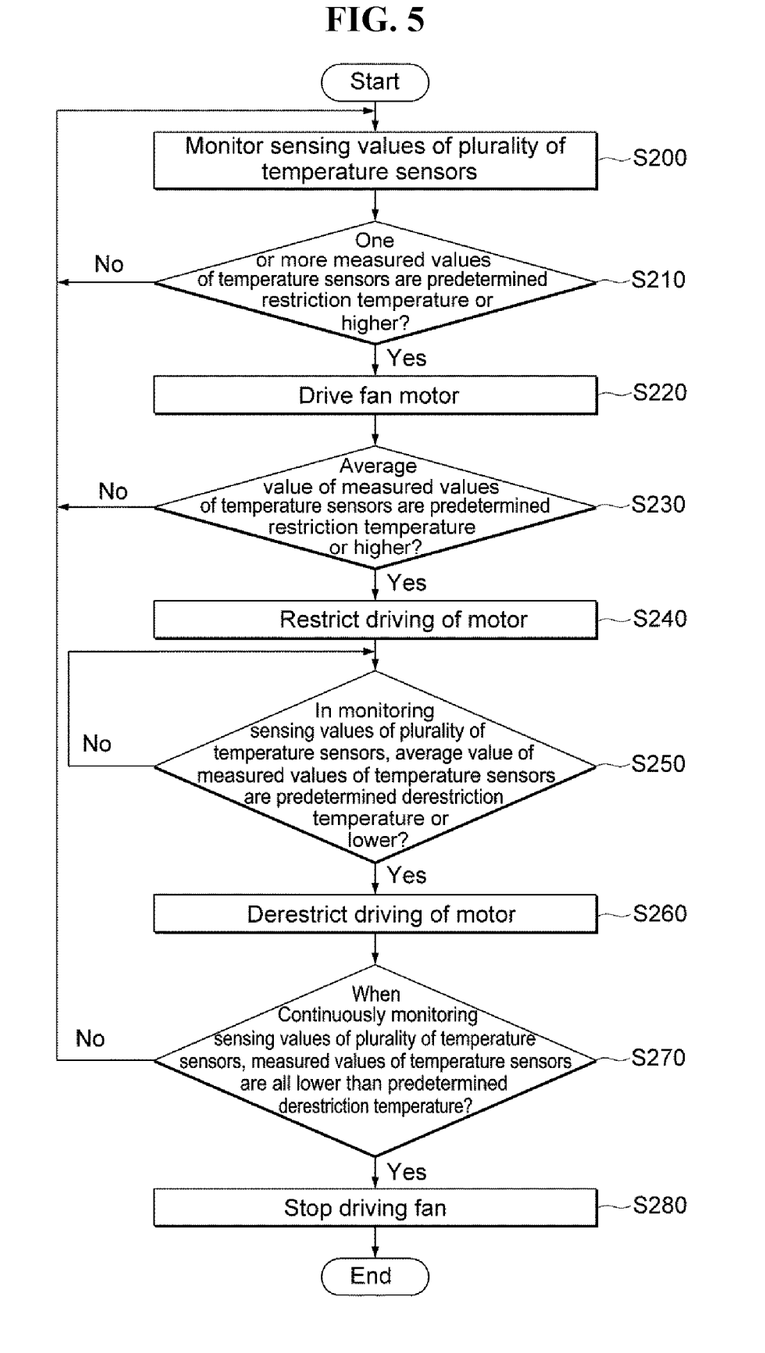
FIG. 5 is a flowchart illustrating a method for controlling a motor of an industrial vehicle according to another embodiment.
Figure 6:
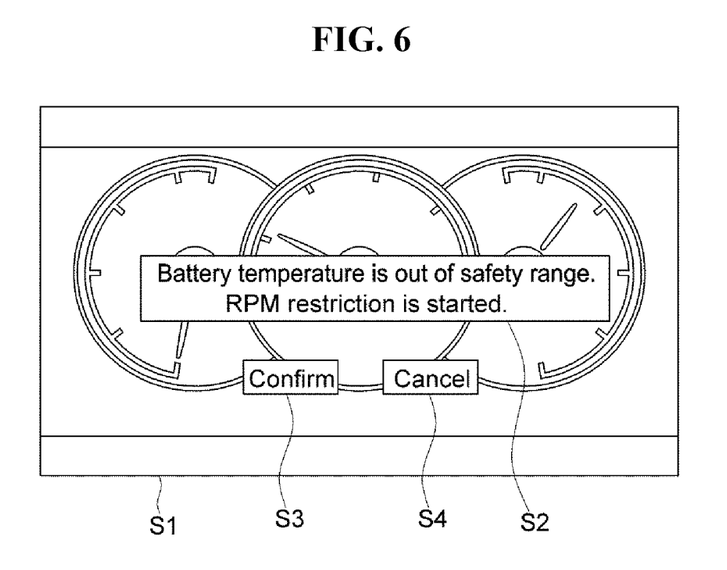
FIG. 6 is an exemplary view illustrating a screen indicating whether a motor is restricted according to an embodiment.

FIG. 5 is a flowchart illustrating a method for controlling a motor of an industrial vehicle according to another embodiment, and FIG. 6 is an exemplary view illustrating a screen indicating whether a motor is restricted according to an embodiment.

A battery monitoring unit monitors measured values of a plurality of temperature sensors of battery temperature sensor unit that sense temperatures of different battery cells of a battery pack (S200).

The battery monitoring unit identifies whether the measured value of at least one temperature sensor is substantially equal to or higher than a restriction temperature that is predetermined (S210).

In step S210, in a case where the battery monitoring unit determines that the measured value of at least one temperature sensor is substantially equal to or higher than the restriction temperature that is predetermined, the battery monitoring unit drives a fan motor (S220).

In step S210, in a case where the battery monitoring unit determines that the measured value of any one of the temperature sensors is lower than the restriction temperature that is predetermined, the process returns to step S200.

After step S220, the battery monitoring unit identifies whether an average temperature of the measured values of the plurality of temperature sensors is substantially equal to or higher than the restriction temperature (S230). In a case where the average temperature of the plurality of temperature sensors is substantially equal to or higher than the restriction temperature, temperature information is transmitted to a vehicle control unit to restrict driving of the motor (S240).

In step S230, in a case where the battery monitoring unit determines that the average temperature of the measured values of the plurality of temperature sensors is lower than the restriction temperature, the battery monitoring unit continuously monitors the measured values of the plurality of temperature sensors.

After step S240, the battery monitoring unit continuously monitors the measured values of the plurality of temperature sensors, and the battery monitoring unit identifies whether the average temperature of the measured values of the plurality of temperature sensors is substantially equal to or lower than a derestriction temperature that is predetermined (S250).

In step S260, in a case where the average temperature of the plurality of temperature sensors is lower than the derestriction temperature, the battery monitoring unit releases the drive restriction of the motor (S260).

After step S260, the battery monitoring unit continuously monitors the measured values of the plurality of temperature sensors, and identifies whether all of the measured values of the plurality of temperature sensors are lower than the derestriction temperature that is predetermined (S270).

In step S260, in a case where all of the measured values of the plurality of temperature sensors are lower than the derestriction temperature that is predetermined, the battery monitoring unit transmits temperature information to a fan control unit, and the fan control unit stops driving of the fan (S280).

In step S270, in a case where any one of the measured values of the plurality of temperature sensors is substantially equal to or higher than the derestriction temperature that is predetermined, the process returns to step S200.

As such, the method for controlling motor performance according to a battery temperature using a plurality of temperature sensors according to an embodiment drives a fan when one of temperatures of the plurality of temperature sensors is out of a predetermined range, and restricts driving of a motor of an industrial vehicle when an average temperature of the temperatures of the plurality of temperature sensors is out of a predetermined range.

In a modified embodiment, before the vehicle control unit 150 controls the RPM of at least one of the drive motor and the hydraulic pump, a message 52 notifying restriction or derestriction of the motor is output on a display screen 51 of the output unit, as illustrated in FIG. 6.

In addition, a confirm icon 53 and a cancel icon 54 may be also provided in the message. An operator may prevent transmission of an RPM limit signal from the vehicle control unit 150 and 1150 by selecting the cancel icon 54 of the message 52 that notifies restriction of the motor.

When the cancel icon 54 is selected by the operator, the interface unit 130 transmits a signal for preventing transmission of the RPM limit signal to the vehicle control unit 150 and 1150. When the vehicle control unit 150 and 1150 receives the signal for preventing transmission of the RPM limit signal from the interface unit 130, transmission of the RPM limit signal may be prevented.

Such obtaining confirmation from the operator through the display screen 51 may be added or omitted by a designer, or may be set to be selected by the operator.

However, when the process of obtaining confirmation from the operator through the display screen 51 is performed, the RPM of the motor may be substantially prevented from being driven against the intention of the operator.

As set forth hereinabove, according to one or more embodiments of the present invention, the temperature of the battery is substantially prevented from rising further, thereby preventing degradation in durability of the battery.

In addition, the performance degradation of the industrial vehicle is substantially minimized, while a temperature rise of the battery cell is substantially prevented.

From the foregoing, various exemplary embodiments in accordance with the present invention have been described, and it will be apparent to those of ordinary skill in the art that the various exemplary embodiments described hereinabove are given for purposes of illustration only, and that various changes in form and detail may be made thereto without departing from the spirit and scope of the present invention.

What is claimed is:

1. An apparatus for controlling vehicle motors based on a battery temperature, the apparatus comprising:
    a battery temperature sensor configured to measuring a temperature of a battery pack of an industrial vehicle;
    a battery monitor configured to monitoring a measured value of the battery temperature sensor, and to transmitting temperature information when the temperature of the battery pack is out of a reference value that is predetermined;

a vehicle drive control configured to restrict driving of a motor that receives a power from the battery pack based on the temperature information; and a fan drive control configured to control driving of a fan that cools the battery pack based on the temperature information, wherein:

the battery temperature sensor comprises a plurality of temperature sensors configured to sensing temperatures of different battery cells of the battery pack that comprises a plurality of battery cells, and based on the temperature information, the battery monitor transmits the temperature information to the fan controller to turn on the fan of the battery pack when a measured value of at least one of the plurality of temperature sensors is out of a first reference temperature that is predetermined, and transmits the temperature information to the vehicle controller to restrict driving of at least one of the drive motor and the pump motor when an average value of the plurality of temperature sensors is out of the first reference temperature that is predetermined.

2. The apparatus of claim 1, further comprising an output unit configured to notify a user of one or more of the temperature information and restriction of driving of the motor, based on the temperature information.

3. The apparatus of claim 1, wherein the vehicle drive control limits a revolutions per minute (RPM) of at least one of a drive motor and a pump motor when the temperature of the battery pack is higher than a drive restriction temperature that is predetermined, the fan drive control drives the fan of the battery pack when the temperature of the battery pack is higher than a caution temperature that is predetermined, and the drive restriction temperature is substantially equal to or higher than the caution temperature.

4. The apparatus of claim 3, wherein the vehicle drive control releases restriction of driving of at least one of the drive motor and the pump motor when the temperature of the battery pack is lower than a derestriction reference temperature that is predetermined, the fan drive control stops driving of the fan of the battery pack when the temperature of the battery pack is lower than a safety reference temperature that is predetermined, and the derestriction reference temperature is substantially equal to or higher than the safety reference temperature.

5. The apparatus of claim 4, wherein the caution temperature is substantially equal to or higher than the safety reference temperature, and the drive restriction temperature is substantially equal to or higher than the derestriction reference temperature.

6. The apparatus of claim 1, wherein based on the temperature information, the fan drive control transmits the temperature information to the vehicle drive control to release restriction of driving of at least one of the drive motor and the pump motor when the measured value of at least one of the plurality of temperature sensors is substantially equal to or lower than a second reference temperature that is predetermined, and the vehicle drive control transmits the temperature information to the fan drive control to turn off the fan of the battery pack when an average value of the plurality of temperature sensors is substantially equal to or lower than the second reference temperature that is predetermined.

7. A method for controlling vehicle motors based on a battery temperature, the method comprising:

a battery temperature sensor measuring a temperature of a battery pack of an industrial vehicle;

a battery monitor monitoring the measured temperature, and transmitting temperature information when the measured temperature is out of a reference value that is predetermined;

a fan drive control driving a fan based on the temperature information so as to cool the battery pack; and a vehicle drive control restricting driving of at least one of a drive motor and a pump motor based on the temperature information, wherein:

the battery temperature sensor comprises a plurality of temperature sensors, in the measuring of the temperature of the battery pack of the industrial vehicle by the battery temperature sensor, the plurality of temperature sensors sense temperatures of different battery cells of the battery pack that comprises a plurality of battery cells, in the driving of the fan, the fan of the battery pack is turned on when a measured value of at least one of the plurality of temperature sensors is out of a first reference temperature that is predetermined, and in the restricting of driving of at least one of the drive motor and the pump motor, driving of at least one of the drive motor and the pump motor is restricted when an average value of the plurality of temperature sensors is out of the first reference temperature that is predetermined.

8. The method of claim 7, wherein the restricting of driving of at least one of the drive motor and the pump motor by the vehicle drive control comprises:

the vehicle drive control limiting a revolutions per minute (RPM) of at least one of the drive motor and the pump motor when the temperature of the battery pack is higher than a drive restriction temperature that is predetermined.

9. The method of claim 7, further comprising:

the vehicle drive control releasing the restriction of driving of at least one of the drive motor and the pump motor when the temperature of the battery pack is lower than a derestriction reference temperature that is predetermined, and the fan drive control stopping driving of the fan of the battery pack when the temperature of the battery pack is lower than a safety reference temperature that is predetermined.

10. The method of claim 7, further comprising: based on the temperature information, the fan drive control transmitting the temperature information to the vehicle drive control to release the restriction of driving of at least one of the drive motor and the pump motor when the measured value of at least one of the plurality of temperature sensors is substantially equal to or lower than a second reference temperature that is predetermined, and the vehicle drive control transmitting the temperature information to the fan drive control to turn off the fan of the battery pack when the average value of the plurality of temperature sensors is out of the second reference temperature that is predetermined.

* * * * *